United States Patent Office 3,432,643
Patented Mar. 11, 1969

3,432,643
MULTIZONE TEMPERATURE CONTROL
Francis Finnegan, Plainville, and Charles D. Flanagan, Attleboro, Mass., assignors to Texas Instruments Incorporated, Dallas, Tex., a corporation of Delaware
Filed Dec. 30, 1966, Ser. No. 606,356
U.S. Cl. 219—501  11 Claims
Int. Cl. H05b 1/02

ABSTRACT OF THE DISCLOSURE

A plurality of temperature control circuits, each of which is operative to maintain the temperature in a respective zone at a respective preselected temperature, are collectively adjusted by means of a reference signal of adjustable amplitude supplied to all of the control circuits. In each control circuit the reference signal cooperates with a control voltage which varies as a function of the temperature in the respective zone to determine the magnetization of a saturable reactor core. This magnetization of the core determines the phase angle of triggering of an SCR thereby to vary the energization of a heater which affects the temperature in the respective controlled zone to maintain it at the preselected level.

Background of the invention

In various industries and particularly in the manufacture of synthetic fibers, it is necessary to maintain within close limits the temperatures at a multiplicity of points in the manufacturing process. Since the conditions which affect the temperature at any one point may vary independently of conditions at the other points, it is highly desirable that a separate feedback type temperature controller be provided for each such point. Further, it may be desirable or necessary under certain circumstances, such as in the starting up of a fiber manufacturing process, to simultaneously readjust all of the controlled temperatures to a lower or higher level.

Summary of the invention

It is an object of the present invention to provide multizone temperature control apparatus in which a plurality of feedback temperature control circuits may be collectively adjusted; to provide such apparatus in which the temperatures in the different zones may be adjusted from a central or remote location; to provide such apparatus which will maintain the temperature in each zone at a respective preselected temperature within close limits; the provision of such apparatus which is highly reliable; and the provision of such apparatus which is relatively simple and inexpensive. Other objects and features will be in part apparent and in part pointed out hereinafter.

Briefly, apparatus according to this invention is operative for maintaining the temperature in a plurality of zones at respective preselected temperatures which are collectively adjustable. The apparatus includes a source for providing a reference signal of adjustable amplitude to a plurality of temperature control circuits. Each of the temperature control circuits has means, such as a heater, in heat exchange relationship with the respective zone for varying the zone temperature and A.C. electric power is applied to the temperature varying means through a triggerable semiconductor switching device. A thermistor is provided for sensing the temperature in each zone and each thermistor is connected in a respective voltage divider for providing a control voltage which varies as a function of the temperature in the respective zone. Each temperature control circuit includes a saturable magnetic core and first and second circuit means for magnetizing the core. The first circuit means in each control circuit is interconnected with the respective voltage divider and the common reference signal source for magnetizing the respective core in one direction to an extent which varies as a function of both the respective control voltage and the common reference signals during A.C. half-cycles of one polarity. The second circuit means includes a winding for magnetizing the respective core in the opposite direction to an extent which increases with time during A.C. half-cycles of opposite polarity. The winding is interconnected with the respective semiconductor switching device for triggering the device into conduction after the core saturates, the phase angle at which the device is triggered being a function of the previous magnetization of the core by the respective first circuit means. Accordingly, the proportion of time during which each device conducts is a function of the temperature of the respective zone and the amplitude of the common reference signal. The zone temperatures are thereby maintained at respective predetermined levels selected collectively by the amplitude of the reference signal.

Brief description of the drawings

Corresponding reference characters indicate corresponding parts throughout the several views of the drawings.

Description of the preferred embodiments

Figure 1:
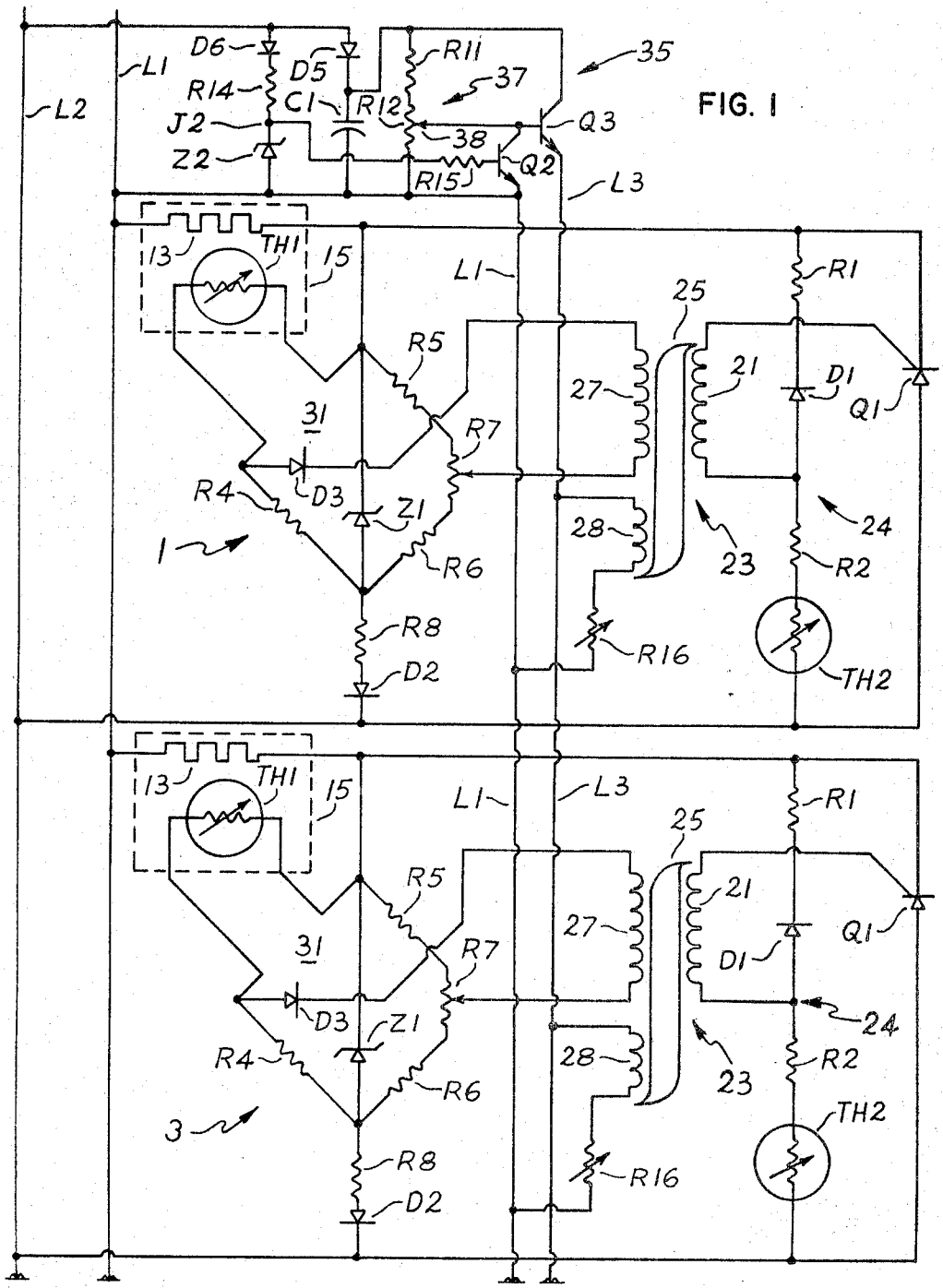
FIG. 1 is a schematic circuit diagram of apparatus according to the present invention for maintaining the temperatures in a plurality of zones at respective levels which are commonly adjustable.

Referring now to the temperature control apparatus shown in FIG. 1, A.C. power, for example at 115 volts and 60 c.p.s., is provided through a pair of supply lines L1 and L2. The apparatus includes a plurality of similar temperature control circuits 1, 3, etc., each of which is operative to modulate the power supplied to an electric heater 13 for maintaining the temperature within a respective controlled zone 15 at a preselected level. As explained hereinafter, each control circuit is responsive to changes in the resistance of an NTC thermistor TH1 adapted to sense the temperature within the respective zone 15.

Taking as an example temperature control circuit 1, heater 13 is provided with unidirectional pulses of electric power through the anode-cathode circuit of a silicon controlled rectifier (SCR) Q1. The SCR Q1 is a semiconductor current switching device which can be triggered into conduction by current applied to its gate electrode when its anode-cathode circuit is forward biased. Once conduction is initiated, the device remains in conduction until the forward bias is removed.

The power supplied to heater 13 is modulated by varying the firing time or phase angle of the SCR triggering relative to the half-cycles of A.C. power during which SCR Q1 is forward biased. By varying the firing time, the proportion of time during which power is supplied to heater 13 and the heat output of the heater are also varied. Triggering current for the gate circuit of SCR Q1 is provided from the gate winding 21 of a saturable triggering reactor 23. The gate winding is biased by a voltage divider 24 which bridges the anode-cathode circuit of SCR Q1 and which includes in series a first resistor R1, a diode D1, a second resistor R2 and an NTC thermistor TH2. Thermistor TH2 is exposed to the ambient temperature in the vicinity of the control circuitry. One end of winding 21 is connected to the divider between diode D1 and resistor R2 and the other end is connected to the gate terminal of SCR Q1.

Saturable reactor 23 includes a magnetic core which possesses so-called square loop hysteresis characteristics. The core having these characteristics is represented in the drawing by the symbol indicated at 25. In that the saturation characteristics of core 25 may vary with changes in ambient temperature, temperature compensation is provided by means of thermistor TH2 which provides an increased bias voltage to winding 21 at higher ambient temperatures to offset corresponding changes in the magnetic characteristics of core 25.

Thermistor TH1 is connected as one arm of a resistance bridge 31. A second arm of the bridge is constituted by a resistor R4 and the remaining two arms are each constituted by a respective fixed resistor R5 or R6 and a respective portion of the resistance of a potentiometer R7. The bridge is connected across the anode-cathode circuit of SCR Q1 through a circuit which includes a voltage dropping resistor R8 and a diode D2. Diode D2 is oriented so that bridge 31 is energized alternately with voltage divider 24 on successive half-cycles of the A.C. supplied through line L1 and L2. The voltage applied to the bridge itself is regulated by a Zener diode Z1.

Saturable reactor 23 also includes a reset winding 27 and a reference winding 28 wound on core 25. The reference windings 28 in the various control circuits 1, 3, etc., are energized by a common reference signal as described hereinafter while reset winding 27 in each control circuit is connected to the respective bridge 31 for sensing or responding to its unbalance. One end of the reset winding 27 is connected, through a diode D3, to the junction between thermistor TH1 and resistor R4. Thermistor TH1 and resistor R4 constitute a voltage divider and the junction between them provides a control voltage which varies as a function of the temperature in the respective zone 15. The other end of winding 27 is connected to the variable tap of potentiometer R7. Diode D3 in series with winding 27 substantially decouples it from bridge 31 when the winding 21 is being energized so that the reactor is not then loaded by the bridge elements.

The reference windings 28 in the different temperature control circuits 1, 3 are commonly or collectively energized from a gated D.C. power supply 35. Uniderectional pulses of current are obtained from lines L1 and L2 through a diode D5 and these pulses are filtered by a capacitor C1 to provide D.C. A voltage divider 37 is connected across capacitor C1. Divider 37 includes a fixed resistor R11 and a potentiometer R12 having an adjustable contact 38. The adjustable contact 38 is selectively shunted to line L2 through the collector-emitter circuit of an NPN transistor Q2.

A voltage divider 39 comprising a diode D6, a current limiting resistor R14 and a Zener diode Z2 is connected across lines L1 and L2 for providing, at a junction J2, a clipped voltage pulse which is "on" during those A.C. half-cycles when line L2 is positive with respect to line L1. This pulse voltage is applied, through a resistor R15, to the base terminal of transistor Q2 thereby to turn this transistor on during those A.C. half-cycles when line L2 is positive as described previously. Since conduction in transistor Q2 shunts the lower portion of the potentiometer R12, it can be seen that the portion of the voltage on capacitor C1 which is selected by the adjustment of the potentiometer is present at adjustable contact 38 only during the alternate A.C. half-cycles, that is, when line L1 is positive with respect to line L2. Potentiometer contact 38 is connected to the base terminal of an NPN transistor Q3 which is connected as an emitter-follower. The gated voltage thus provided at the emitter of transistor Q3 is employed as a reference signal of preselected amplitude and is applied to a line L3 for commonly energizing the reference windings 28 of the different temperature control circuits 1, 3, etc. Line L3 is connected to one end of each of the windings 28 and the other end of each winding 28 is connected to line L1 through a respective rheostat R16. The rheostats R16 permit the response of the respective temperature control circuits to the gated reference signal to be individually adjusted.

The operation of each of the temperature control circuits 1, 3, etc., shown in FIG. 1 is described in greater detail in copending application Ser. No. 549,053, filed May 10, 1966, but briefly is as follows. During those A.C. half-cycles which forward bias diode D1, SCR Q1 is triggered by current flowing through winding 21 only after core 25 saturates in the corresponding magnetic direction. Until saturation occurs, the flow of current from divider 24 to the SCR gate electrode is opposed by the inductive reactance voltage developed in winding 21 by the changing magnetic flux in core 25. However, after the core saturates, winding 21 exhibits a low impedance and triggering current flows to the gate of SCR Q1. The rise in current level occurs quite abruptly and the time of firing is thus relatively independent of the characteristics of the SCR. At the end of the triggering half-cycle, the magnetizing current applied to winding 21 by divider 24 is withdrawn.

On the half-cycles when diode D2 is forward biased, a voltage regulated by Zener diode 21 is applied to bridge 31. Depending upon the temperature of thermistor TH1 and the setting of potentiometer R7, the bridge may or may not be balanced. If the bridge is unbalanced so that the control voltage provided at the junction between thermistor TH1 and resistor R4 is positive with respect to the potential at the variable tap of potentiometer R7, a biasing voltage will be applied to winding 27 and will induce a current flow therein tending to magnetize core 25 in the magnetic direction which is opposite that produced by winding 21.

The magnetization produced by winding 27 acts together with the energization of winding 28 from the gated D.C. supply 35 during the same A.C. half-cycles and the extent of this combined magnetization varies as a function of the amplitude of the reference signal as determined by the setting of potentiometer R12. The magnetization produced by the windings 27 and 28 together is in effect a presetting of the core's magnetization, the extent of this presetting magnetization being a function of both the temperature in the respective zone 15 and the amplitude of the reference signal carried by line L3.

The absolute values of the components of bridge 31 and supply 35 are chosen in relation to the applied voltages so that, near the temperature which is to be controlled, the core 25 is not saturated in the presetting direction but rather attains only some intermediate magnetization.

As noted previously, when the applied A.C. then returns to a triggering half cycle during which diode D1 is forward biased, the SCR Q1 will not fire until the core 25 is saturated by the current flowing in winding 21. The delay or time required to reach saturation for the given voltage applied to winding 21 depends upon the previous or presetting magnetization given to the core 25 by the windings 27 and 28. The delay is thus in part a function of the resistance of thermistor TH1 since that resistance is a factor affecting the unbalance of the bridge 31. Accordingly, variations in the resistance of thermistor TH1 will vary the firing angle of SCR Q1 and thereby modulate the average power supplied to heater 13.

Thermistor TH1 has a negative temperature coefficient so that, as the temperature in zone 15 increases, the resistance of the thermistor decreases. A decrease in thermistor resistance causes an increase in the preset magnetizing current and thus it also increases the delay which must elapse before firing of SCR Q1 on the triggering A.C. half-cycle. An increased delay leaves less time for current to flow through heater 13 during the remainder of the A.C. half-cycle and thus the average power to heater 13 is decreased as a result of increasing thermistor temperature. The modulation of the heater power by thermistor TH1 thus provides a negative feedback which tends to maintain the temperature in the respective zone at a respective predetermined level, the feedback operation in each control circuit 1, 3, etc., being independent of the feedback operation of the others.

The delay before firing of each SCR Q1 is also in part a function of the magnetization provided by winding 28. It can thus be seen that the respective predetermined temperature levels which the individual control circuits 1, 3, etc., tend to maintain can be commonly or collectively adjusted in interdependent fashion by varying the amplitude of the gated reference signal applied through line L3. The particular temperature which each control circuit maintains for a given reference signal amplitude can be individually adjusted by means of the respective potentiometer R7 which affects the balance of the bridge 31 which includes the sensing thermistor TH1.

From the above it can be seen that each of the temperature control circuits 1, 3, etc., operates independently in a feedback mode to maintain the temperature in the respective zone at a predetermined level despite any local variations in thermal load, ambient temperature, etc., but that all of these controlled temperatures can be collectively adjusted in interdependent fashion by varying the setting of the potentiometer R12 which determines the amplitude of the common reference signal. This one control may be conveniently positioned at a central or remote location. Thus it can be seen that, during the starting up of a synthetic fiber process for example, the temperatures at a large number of critical points may be adjusted by the setting of a single control while a tight, feedback mode control is maintained over the individual temperature at each such point.

Figure 2:
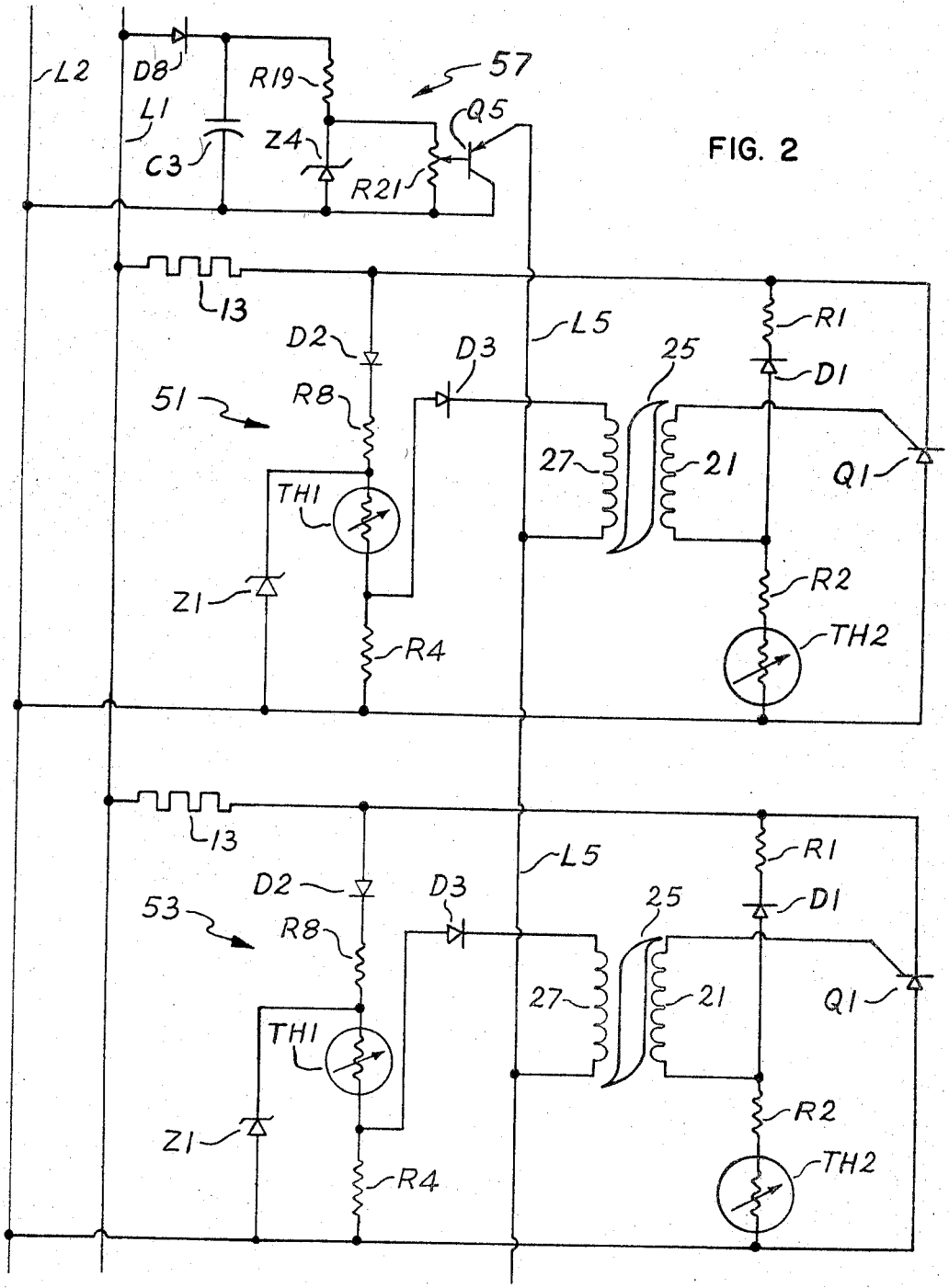
FIG. 2 is a schematic circuit diagram of another embodiment of this invention.

The embodiment of the present invention illustrated in FIG. 2 employs a plurality of temperature control circuits 51, 53, etc., which are essentially quite similar to the temperature control circuits 1, 3, etc., employed in the apparatus of FIG. 1. This embodiment, however, does not employ separate reference windings 28 on the saturable magnetic cores 25 for obtaining a common adjustment of all the temperature control circuits. Rather, the single presetting winding 27 in each control circuit is energized to an extent which is a function of both a resistance of the respective sensing thermistor TH1 and the amplitude of a common reference signal provided to all of the temperature control circuits. One end of winding 27 is connected, through diode D3, to the control voltage source constituted by the junction between thermistor TH1 and resistor R4 as in the previous embodiment. Rather than being then returned to the opposite side of a bridge circuit, however, the other end of winding 27 is connected to a lead L5 which is maintained at a preselected D.C. level by an adjustable D.C. supply circuit 57. The magnetizing force applied to the core 25 by winding 27 thus varies as a function of the difference between these two voltages.

In supply circuit 57, a succession of pulses of current obtained from lines L1 and L2 through a diode D8 is filtered by a capacitor C3 to obtain a source of direct current. A regulated source of D.C. at reduced voltage is provided by a Zener diode Z4 which is energized from capacitor C3 through a dropping resistor R19. An adjustable portion of the Zener voltage is applied to the base terminal of a PNP transistor Q5 by a potentiometer R21. Transistor Q5 is connected as an emitter-follower for providing substantially this selected portion of the Zener voltage to lead L5 at low impedance.

As will be apparent to those skilled in the art, the energization of winding 27 during those A.C. half-cycles when the line L1 is positive with respect to L2 will be a function both of the resistance of thermistor TH1 and a function of the reference signal voltage provided through line L5. Accordingly, it can also be seen that the magnetic presetting of core 25 will similarly be a function of both of these parameters and that the firing angle and the energization of heater 13 will vary as a function of these variables.

Thus, for a given setting of potentiometer R21, each temperature control circuit 51, 53, etc. will maintain the temperature in its controlled zone at a respective predetermined level and the various temperature levels maintained by the different controls can be commonly or collectively adjusted by varying the voltage provided at line L5 by means of the one potentiometer R21.

While in the examples illustrated, heaters have been used to vary the temperatures in the controlled zones, it should be understood that, with suitable rearrangement of components, cooling means such as a thermoelectric cooler may also be used to vary the temperature within the controlled zones. Similarly, positive temperature coefficient thermistors may be used for sensing and other semiconductor switching devices may be substituted for the SCR shown. It will also be understood that the circuits can be modified to supply full wave power by the addition of an inverse parallel SCR triggered by means known to those skilled in the art.

In view of the above, it will be seen that the several objects of the invention are achieved and other advantageous results attained.

As various changes could be made in the above apparatus and methods without departing from the scope of the invention, it is intended that all matter contained in the above description or shown in the accompanying drawings shall be interpreted as illustrative and not in a limiting sense.

What is claimed is:

1. Apparatus for maintaining the temperature in a plurality of zones at respective preselected temperatures which are collectively adjustable, said apparatus comprising:
   a source for providing a reference signal of adjustable amplitude;
   a plurality of temperature control circuits each of which includes:
      means in heat exchange relationship with a respective zone for varying the temperature thereof when energized;
      a triggerable semiconductor switching device for switching the flow of power to said means,
      means for supplying A.C. electric power to said means and said semiconductor switching device,
      a thermistor adapted to sense the temperature in the respective zone,
      voltage divider means including said thermistor for providing a control voltage which varies as a function of the temperature in the respective zone,
      a saturable magnetic core,
      first circuit means interconnected with said voltage divider means and said source for magnetizing said core in one direction to an extent which varies as a function of both said control voltage and said reference signal during A.C. half-cycles of one polarity,
      second circuit means including a winding for magnetizing said core in the opposite direction to an extent which increases with time during A.C. half-cycles of opposite polarity, said winding being interconnected with said semiconductor switching device for triggering said device into conduction after said core saturates, the phase angle at which said device is triggered being a function of the previous magnetization of said core by said first circuit means,
   whereby the proportion of time during which each device conducts is a function of the temperature of the respective zone and the amplitude of the common reference signal thereby maintaining the zone temperatures at respective predetermined levels selected collectively by the amplitude of said reference signal.

2. Apparatus as set forth in claim 1 wherein each of said means for varying the temperature of said zone comprises an electric heater.

3. Apparatus as set forth in claim 1 wherein said switching devices are silicon controlled rectifiers.

4. Apparatus as set forth in claim 1 wherein said first circuit means in each of said control circuits includes one winding which is interconnected with the respective voltage divider means for magnetizing the respective core to an extent which varies as a function of the respective control voltage and another winding which is connected to said source for magnetizing said core to an extent which varies as a function of the amplitude of said reference signal.

5. Apparatus as set forth in claim 4 wherein said source includes means for gating said reference signal whereby each of said other windings applies a magnetizing force to the respective core only during A.C. half-cycles of said one polarity.

6. Apparatus as set forth in claim 4 wherein the said other windings are connected in parallel.

7. Apparatus as set forth in claim 5 which further includes a rheostat in series with each of said other windings for adjusting the magnetization of the respective core produced by said reference signal.

8. Apparatus as set forth in claim 1 wherein said source provides a reference signal of adjustable voltage.

9. Apparatus as set forth in claim 8 wherein each said first circuit means includes a reset winding one end of which is connected to the respective voltage divider means and the other end of which is connected to said source for applying to the respective core a magnetizing force which varies as a function of the difference between the respective control voltage and the common reference signal voltage.

10. Apparatus for maintaining the temperature in a plurality of zones at respective preselected temperatures which are collectively adjustable, said apparatus comprising:
a plurality of temperature control circuits each of which includes:
means in heat exchange relationship with a respective zone for varying the temperature thereof when energized,
a triggerable semiconductor switching device for switching the flow of power to said means,
means for supplying A.C. electric power to said means and said semiconductor switching device,
a thermistor adapted to sense the temperature in the respective zone,
voltage divider means including said thermistor for providing a control voltage which varies as a function of the temperature in the respective zone,
a saturable magnetic core,
first circuit means including a first winding which is interconnected with said voltage divider means for magnetizing said core in one direction to an extent which varies as a function of said control voltage during A.C. half-cylces of one polarity,
second circuit means including a second winding for magnetizing said core in the opposite direction to an extent which increases with time during A.C. half-cycles of opposite polarity, said second winding being interconnected with said semiconductor switching device for triggering said device into conduction after said core saturates, the phase angle at which said device is triggered being a function of the previous magnetization of said core, and
a third winding on said core; and
a gated source for applying a reference current to said third windings during A.C. half-cycles of said one polarity thereby to modify the extent of magnetization by said first winding whereby the proportion of time during which each device conducts is a function of the temperature of the respective zone and the amplitude of the common reference current thereby maintaining the zone temperatures at respective predetermined levels selected collectively by the amplitude of said reference current.

11. Apparatus for maintaining the temperature in a plurality of zones at respective preselected temperatures which are collectively adjustable, said apparatus comprising:
a source for providing a reference signal of adjustable voltage;
a plurality of temperature control circuits each of which includes:
a heater in heat exchange relationship with a respective zone for increasing the temperature thereof when energized,
a silicon controlled rectifier for switching the flow of power to said means,
means for supplying A.C. electric power to said heater means and said silicon controlled rectifier,
a thermistor adapted to sense the temperature in the respective zone,
voltage divider means including said thermistor for providing a control voltage which varies as a function of the temperature in the respective zone,
a saturable magnetic core,
first circuit means including a first winding one end of which is connected to said voltage divider means and the other end of which is connected to said source for magnetizing said core in one direction to an extent which varies as a function of the difference between said control voltage and said reference signal during A.C. half-cycles of one polarity,
second circuit means including a second winding for magnetizing said core in the opposite direction to an extent which increases with time during A.C. half-cycles of opposite polarity, said second winding being interconnected with said silicon controlled rectifier for triggering said rectifier into conduction after said core saturates, the phase angle at which said rectifier is triggered being a function of the previous magnetization of said core by said first winding,
whereby the proportion of time during which each rectifier conducts is a function of the temperature of the respective zone and the voltage of the common reference signal thereby maintaining the zone temperatures at respective predetermined levels selected collectively by the voltage of said reference signal.

References Cited

UNITED STATES PATENTS

| | | | |
|---|---|---|---|
| 3,149,224 | 9/1964 | Horne et al. | 219—501 |
| 3,369,108 | 2/1968 | Strachan | 219—501 |

BERNARD A. GILHEANY, *Primary Examiner.*

F. E. BELL, *Assistant Examiner.*

U.S. Cl. X.R.

219—503